United States Patent
James

(10) Patent No.: US 11,367,209 B2
(45) Date of Patent: Jun. 21, 2022

(54) VISUAL DETECTION OF HALOCLINES

(71) Applicant: X Development LLC, Mountain View, CA (US)

(72) Inventor: Barnaby John James, Los Gatos, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/078,490

(22) Filed: Oct. 23, 2020

(65) Prior Publication Data

US 2022/0130061 A1   Apr. 28, 2022

(51) Int. Cl.
| | |
|---|---|
| G06T 7/571 | (2017.01) |
| A01K 29/00 | (2006.01) |
| A01K 61/13 | (2017.01) |
| H04N 7/18 | (2006.01) |
| G06V 40/10 | (2022.01) |

(52) U.S. Cl.
CPC .............. *G06T 7/571* (2017.01); *A01K 29/00* (2013.01); *A01K 61/13* (2017.01); *G06V 40/10* (2022.01); *H04N 7/18* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 9,489,601 B2 * | 11/2016 | Fairfield | B62D 15/0255 |
| 10,852,201 B2 * | 12/2020 | Laycock | G02B 5/128 |
| 10,898,999 B1 * | 1/2021 | Cohen | B25J 9/0003 |
| 11,089,227 B1 * | 8/2021 | James | H04N 5/23299 |
| 11,089,762 B1 * | 8/2021 | Kozachenok | A01K 29/00 |
| 11,151,737 B1 * | 10/2021 | Li | G06T 7/55 |
| 2019/0168850 A1 * | 6/2019 | Tian | G01S 19/39 |
| 2019/0340440 A1 * | 11/2019 | Atwater | A01K 61/13 |
| 2021/0016580 A1 * | 1/2021 | Kaneko | B41J 11/0035 |
| 2021/0039757 A1 * | 2/2021 | Becher | A01K 61/60 |
| 2021/0142052 A1 * | 5/2021 | James | G06V 40/10 |

(Continued)

FOREIGN PATENT DOCUMENTS

| | | | |
|---|---|---|---|
| CL | 2019000039 A1 | 3/2019 | |
| CN | 104568846 A * | 4/2015 | A01K 61/13 |

(Continued)

OTHER PUBLICATIONS

Crosbie et al., "Effects of step salinity gradients on salmon lice larvae behavior and dispersal," Aquaculture Environment Interactions, May 2019, 11:181-190.

(Continued)

*Primary Examiner* — Reza Aghevli
(74) *Attorney, Agent, or Firm* — Fish & Richardson P.C.

(57) ABSTRACT

Methods, systems, and apparatus, including computer programs encoded on computer-storage media, for visually detecting a halocline. In some implementations, a method includes moving a camera through different depths of water within a fish enclosure, capturing, at the different depths, images of fish, determining that changes in focus in the images correspond to changes in depth that the images were captured, and based on determining that the changes in focus in the images correspond to the changes in depths that the images were captured, detecting a halocline at a particular depth.

23 Claims, 3 Drawing Sheets

(56) References Cited

U.S. PATENT DOCUMENTS

| | | | |
|---|---|---|---|
| 2021/0209351 A1* | 7/2021 | Young | G06T 7/62 |
| 2021/0329891 A1* | 10/2021 | Kozachenok | A01K 61/80 |
| 2021/0329892 A1* | 10/2021 | Kozachenok | H04N 5/23216 |

FOREIGN PATENT DOCUMENTS

| | | | | | |
|---|---|---|---|---|---|
| CN | 110763207 | A | * | 2/2020 | G01C 13/00 |
| CN | 111301646 | A | * | 6/2020 | B63C 11/52 |
| CN | 111357693 | A | * | 7/2020 | A01K 61/13 |
| CN | 111640139 | A | * | 9/2020 | H04N 7/18 |
| CN | 111487224 | B | * | 10/2020 | G01N 21/55 |
| CN | 112180435 | A | * | 1/2021 | G02B 5/128 |
| JP | 2018108550 | A | * | 7/2018 | C02F 1/44 |
| NO | 20160199 | | | 8/2017 | |
| WO | WO2012081990 | | | 6/2012 | |
| WO | WO-2017098223 | A1 | * | 6/2017 | G01D 5/26 |
| WO | WO2017137896 | | | 8/2017 | |
| WO | WO2018011745 | | | 1/2018 | |
| WO | WO-2019180788 | A1 | * | 9/2019 | B01D 61/58 |

OTHER PUBLICATIONS

Crosbie et al., "Impact of thermoclines on the vertical distribution of salmon lice larvae," Aquaculture Environment Interactions, Jan. 2019, 12:1-10.

Maloy et al.. "A spatio-temporal recurrent network for salmon feeding action recognition from underwater videos in aquaculture," Computers and Electronics in Agriculture, Nov. 12, 2019, 9 pages.

Odey, "AquaMesh—Design and Implementation of Smart Wireless Mesh Sensor Networks for Aquaculture," American Journal of Networks and Communications, Jul. 2013, 8 pages.

Petrov et al., "Overview of the application of computer vision technology in fish farming," E3S Web of Conferences, 2020, 175:02015.

Saberloon et al., "Application of Machine Vision Systems in Aquaculture with Emphasis on Fish: State-of-the-Art and Key Issues," Reviews in Aquaculture, Dec. 2017, 9:369-387.

towardsdatascience.com [online], "Analyzing Applications of Deep Learning in Aquaculture," Jan. 2021, retrieved on Aug. 11, 2021, retrieved from URL<https://towardsdatascience.com.analyzing-applications-of-deep-learning-in-aquaculture-7a273399553/>, 12 pages.

Wang, "Robust tracking of fish schools using CNN for head identification," Multimedia Tools and Applications, Nov. 2017, 20 pages.

Dempster et al. "Submergence of Atlantic salmon (*Salmo salar* L.) in commercial scale sea-cages: A potential short-term solution to poor surface conditions," Aquaculture, Mar. 2009, 288(3-4):254-263.

International Search Report and Written Opinion in International Appln. No. PCT/US2021/055022, dated Jan. 11, 2022, 15 pages.

* cited by examiner

VISUAL DETECTION OF HALOCLINES

FIELD

This specification relates to computer vision, particularly for aquaculture systems.

BACKGROUND

Aquaculture involves the farming of aquatic organisms, such as fish, crustaceans, or aquatic plants. In aquaculture, and in contrast to commercial fishing, freshwater and saltwater fish populations are cultivated in controlled environments. For example, the farming of fish can involve raising fish in tanks, fish ponds, or ocean enclosures.

Haloclines may form in fish enclosures in the ocean when freshwater runoff mixes with ocean water. For example, freshwater flowing out of the fjords to the ocean may form a layer of lower salinity water above higher salinity ocean water. A halocline is a layer of water where salinity changes abruptly. For example, a halocline may form when fresh water forms a layer above salt water.

A halocline may affect the health of fish. For example, sea lice that are harmful to fish may prefer to cluster within or immediately below a halocline. The sea lice may cluster within or immediately below a halocline as the sea lice may be drawn to light from the sun so swim upwards, but stay within or below the halocline as the lower salinity in the water above the halocline may be harmful to the sea lice. The increased concentration of sea lice within or immediately below the halocline may increase a risk that fish will be infected by sea lice.

SUMMARY

In general, innovative aspects of the subject matter described in this specification relate to visually detecting a halocline.

A system may detect a halocline and take action to reduce the risk that fish will be infected by sea lice. For example, fish may be influenced to stay above or below the halocline to reduce the risk of infection by sea lice concentrated within or immediately below the halocline. In another example, delousing and monitoring may be increased to attempt to reduce risk of infection by sea lice.

A halocline may be detected with salinity sensors that measure a conductivity of water to determine a concentration of dissolved salt in the water. For example, higher conductivity measurements may indicate more salinity. However, salinity sensors may require constant calibration to keep in good working order and may be prohibitively expensive.

Instead, a system may visually detect a halocline. Abrupt changes in salinity may make objects within or on another side of a halocline appear to be blurry. For example, a halocline may appear to be a hazy layer. Accordingly, haloclines may be visually detected with a camera. A system may move a camera up and down within an ocean enclosure and capture images with the camera at different depths. The system may then visually detect a halocline based on determining at which depths the images transition from being in focus to out of focus.

One innovative aspect of the subject matter described in this specification is embodied in a method that includes moving a camera through different depths of water within a fish enclosure, capturing, at the different depths, images of fish, determining that changes in focus in the images correspond to changes in depth that the images were captured, and based on determining that the changes in focus in the images correspond to the changes in depths that the images were captured, detecting a halocline at a particular depth.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some aspects determining that changes in focus in the images correspond to changes in depth that the images were captured includes determining distributions of pixels that are out-of-focus and in-focus in the images of the fish and determining that the distributions of pixels that are out-of-focus and in-focus of a subset of the images of the fish satisfy a distribution criteria. In certain aspects, determining that the distributions of pixels that are out-of-focus and in-focus of a subset of the images of the fish satisfy a distribution criteria includes determining that a difference between the distributions of pixels that are out-of-focus and in-focus for the subset of the images of the fish and for a second subset of the images of the fish satisfy the distribution criteria.

In some implementations, determining that a difference between the distributions of pixels that are out-of-focus and in-focus for the subset of the images of the fish and for a second subset of the images of the fish satisfy the distribution criteria includes determining from the distributions that more of the pixels were out-of-focus in the subset of the images than in the second subset of the images, where the images of the second subset of the images were captured at second depths above the depths that the images of the subset of the images were captured. In some aspects, detecting a halocline at a particular depth includes determining that the halocline has a top at the particular depth.

In certain aspects, determining that a difference between the distributions of pixels that are out-of-focus and in-focus for the subset of the images of the fish and for a second subset of the images of the fish satisfy the distribution criteria includes determining from the distributions that less of the pixels were out-of-focus in the subset of the images than in the second subset of the images, where the images of the second subset of the images were captured at second depths below the depths that the images of the subset of the images were captured.

In some implementations, detecting a halocline at a particular depth includes determining that the halocline has a bottom at the particular depth. In some aspects, determining that changes in focus in the images correspond to changes in depth that the images were captured includes determining that a number of fish detected in a particular image satisfies a count criteria and based on determining that the number of fish detected in the particular image satisfies the count criteria, determining the changes in focus in the images based on the particular image and other images.

In certain aspects, actions include one or more of adjusting one or more of a feed depth that the fish are feed or a feed rate that the fish are feed based on detection of the halocline at the particular depth, increasing sea lice mitigation based on detection of the halocline at the particular depth, or disregarding one or more of sea lice detection or fish detection based on detection of the halocline at the particular depth. In some implementations, actions include providing a depth map that indicates a top of the halocline and a bottom of the halocline.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
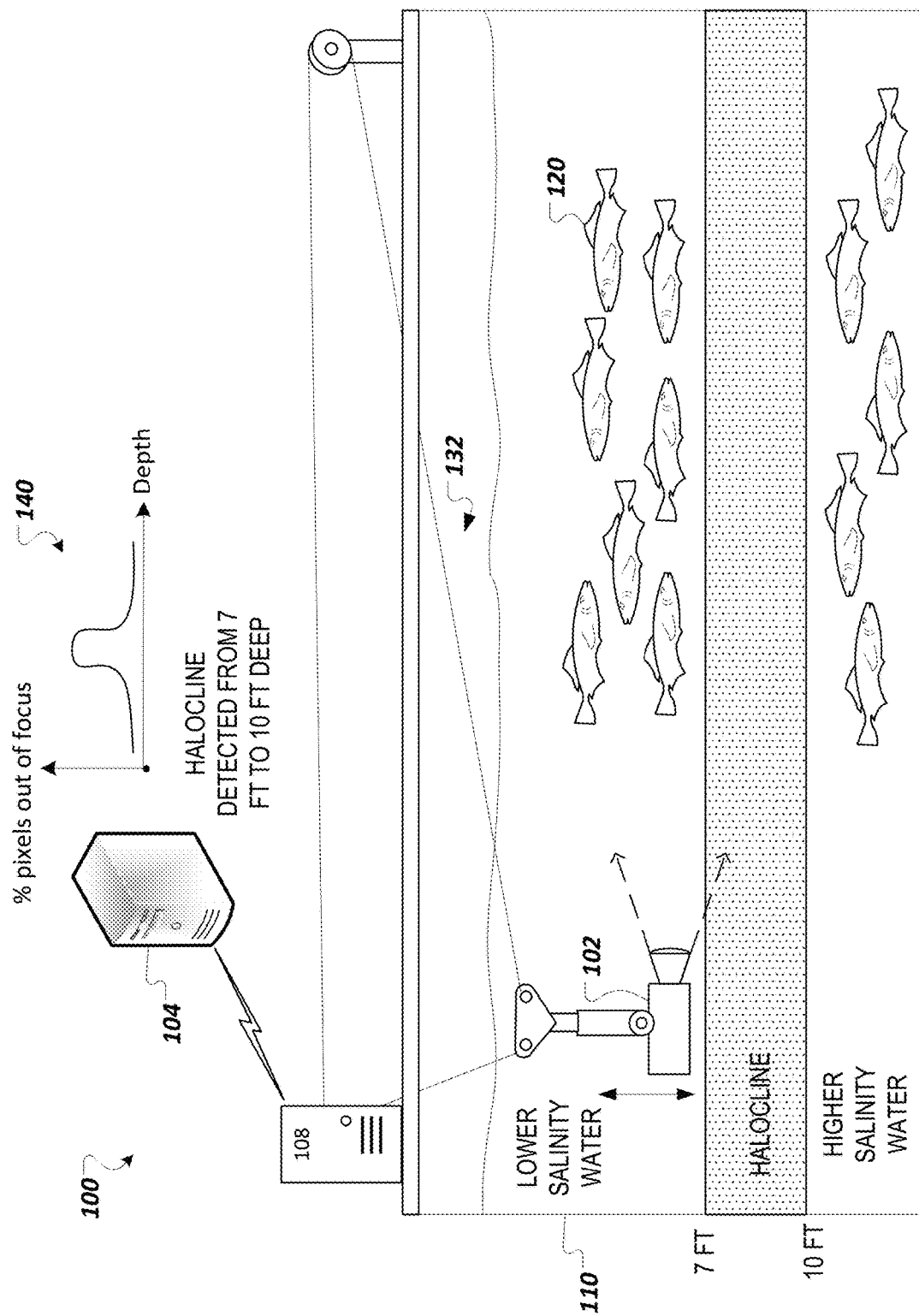
FIG. 1 is a diagram of an example system that visually detects a halocline and an enclosure that contains aquatic livestock.

FIG. 1 is a diagram of an example system 100 that visually detects a halocline and an enclosure 110 that contains aquatic livestock. An enclosure that contains fish may be referred to as a fish enclosure. A Cartesian coordinate system is provided for ease of reference. Although FIG. 1 shows the enclosure 110 extending in the xy-plane, the enclosure further extends in the z-direction, with the positive z-direction extending out of the page of the drawing.

The livestock can be aquatic creatures, such as livestock 120, which swim freely within the confines of the enclosure 110. In some implementations, the aquatic livestock 120 stored within the enclosure 110 can include finfish or other aquatic lifeforms. The livestock 120 can include for example, juvenile fish, koi fish, sharks, salmon, and bass, to name a few examples.

In addition to the aquatic livestock, the enclosure 110 contains water, e.g., seawater, freshwater, or rainwater, although the enclosure can contain any fluid that is capable of sustaining a habitable environment for the aquatic livestock. In some implementations, the system 100 is anchored to a structure such as a pier, dock, or buoy instead of being confined within the enclosure 110. For example, instead of being confined within the enclosure 110, the livestock 120 can be free to roam a body of water, and the system 100 can monitor livestock within a certain area of the body of water.

The system 100 includes a sensor subsystem 102 that generates sensor data, a halocline detection subsystem 104 that detects haloclines based on the sensor data, and a winch subsystem 108 that moves the sensor subsystem 102.

The sensor subsystem 102 includes a camera which can be fully submerged in the enclosure 110. The position of the sensor subsystem 102 within the enclosure 110 is determined by instructions generated by the halocline detection subsystem 104. The sensor subsystem 102 may be waterproof and can withstand the effects of external forces, such as typical ocean currents, without breaking. The system 100 can additionally store the sensor data captured by the sensor subsystem 102 in a sensor data storage. In some implementations, the system 100 can store media, such as video and images, as well as sensor data, such as ultrasound data, thermal data, and pressure data, to name a few examples. Additionally, the sensor data can include GPS information corresponding to a geolocation at which the sensor subsystem captured the sensor data.

The winch subsystem 108 receives the instructions and activates one or more motors to move the sensor subsystem 102 to the position corresponding to the instructions. The winch subsystem 108 can include one or more motors, one or more power supplies, and one or more pulleys to which the cord, which suspends the sensor subsystem 102, is attached. Although the winch subsystem 108 includes a single cord, any configuration of one or more cords and one or more pulleys that allows the sensor subsystem 102 to move and rotate, as described herein, can be used.

The winch subsystem 108 receives an instruction from the halocline detection subsystem 104 and activates the one or more motors to move the cord. The cord, and the attached sensor subsystem 102, can be moved along the x, y, and z-directions, to a position corresponding to the instruction.

A motor of the winch subsystem 108 can be used to rotate the sensor subsystem 102 to adjust the horizontal angle and the vertical angle of the sensor subsystem. A power supply can power the individual components of the winch subsystem. The power supply can provide AC and DC power to each of the components at varying voltage and current levels. In some implementations, the winch subsystem can include multiple winches or multiple motors to allow motion in the x, y, and z-directions.

One or both of the sensor subsystem 102 and the winch subsystem 108 can include inertial measurement devices for tracking motion and determining position of the sensor subsystem, such as accelerometers, gyroscopes, and magnetometers. The winch subsystem 108 can also keep track of the amount of cord that has been spooled out and reeled in, to provide another input for estimating the position of the sensor subsystem 102. In some implementations the winch subsystem 108 can also provide torques applied to the cord, to provide input on the position and status of the sensor subsystem 102. In some implementations, the sensor subsystem 102 can be attached to an autonomous underwater vehicle (AUV), e.g., a tethered AUV.

In some implementations, the halocline detection subsystem 104 detects haloclines based on images captured at different depths by the sensor subsystem 102. The halocline detection subsystem 104 may visually detect a halocline based on determining at which depths the images are more out of focus. For example, the halocline detection subsystem 104 may generate a graph where an x-axis represents depths that the images were captured and a y-axis represents a percentage of pixels in the images that were out of focus, and detect a halocline at a particular depth based on detecting a peak in the graph.

The halocline detection subsystem 104 may detect haloclines based on that haloclines cause blurriness in the visual appearance of fish in the water. For example, the sensor subsystem 102 may continually observe fish at different depths in a water column. In particular, the halocline detection subsystem 104 may continually detect for the edges of fish or a dot pattern on the fish as shown in images captured by the sensor subsystem 102. By looking at the fish sharpness and how it varies with depth, a halocline can be detected at various depths. The halocline detection subsystem 104 may use detections across multiple passes up and down the water column to see how the halocline develops over time and also consider observations from adjacent enclosures at a site to see how localized the halocline is. For example, the halocline detection subsystem 104 may capture images with the sensor subsystem 102 while the sensor subsystem 102 moves downwards from a most shallow position to a deepest position during a minute, and repeats every thirty minutes.

The halocline detection subsystem 104 may use focus peaking techniques to highlight in-focus regions of images. The halocline detection subsystem 104 may then determine a distribution of in-focus pixels and out of focus pixels in each image based on determining the number of pixels in the in-focus regions or the number of pixels not in the in-focus regions or in the out of focus regions. For example, the halocline detection subsystem 104 may obtain a 1080p image that has 2,073,600 pixels, identify ten in-focus regions that each correspond to a different fish, and count that the in-focus regions include 600,000 pixels.

In another example, the halocline detection subsystem 104 may obtain a 1080p image that has 2,073,600 pixels, identify ten in-focus regions that each correspond to a different fish, count that regions outside the in-focus regions include 1,473,600 pixels, and determine that 600,000 pixels are in-focus by subtracting the total of 2,073,600 pixels from 1,473,600 pixels. In still another example, the halocline detection subsystem 104 may obtain a 1080p image that has 2,073,600 pixels, identify two in-focus region that each correspond to a fish, and count that the in-focus regions include 10,000 pixels.

In some implementations, any pair of images may not be compared due to variations in the number of fish in a scene but over a larger number of images, these differences may average out. For example, the halocline detection subsystem 104 may obtain ten images per inch depth and average or take the median of the distributions for the depth. In another example, the halocline detection subsystem 104 may obtain a single image per inch depth and bin together the depths into three feet per group (e.g., 0-3 feet, 3.1-6 feet, 6.1-9 feet, etc.) and average or take the median of the distributions for the group.

The halocline detection subsystem 104 may generate a depth map based on the determined distributions. For example, the halocline detection subsystem 104 may generate a depth map 140 that has depth on an x-axis and a percent of pixels out of focus on a y-axis. The halocline detection subsystem 104 may then detect the halocline based on the detecting a peak in the depth map 140. For example, the halocline detection subsystem 104 may detect a peak in the depth map at depths between seven and ten feet.

In some implementations, the halocline detection subsystem 104 may filter out images that do not have a sufficient number of detected objects. For example, the halocline detection subsystem 104 may retake images for a depth until the images have at least two detected fish. In some implementations, the halocline detection subsystem 104 may stop taking images for a particular depth after the number of detected objects having been detected for a number times in a row. For example, there may be almost no visibility at a boundary of a halocline so no objects may be detected so the halocline detection subsystem 104 may continue moving the sensor subsystem 102 down after five images in a row have zero detected objects.

Applications of halocline detection may include one or more of forcing fish lower in the enclosures when there is higher local salinity, (e.g. using deep feeding lights, deploying a subfeeder, adjustable height enclosures), more actively delousing (e.g., lowering a trigger limit) to mitigate lice development, adjusting feeding rates or maximum pellet depth based on the location of a halocline, or avoiding making biomass, lice, fish recognition detections where image quality is important in areas with poor image quality. In some implementations, delousing may include applying a laser beam to the sea lice, spraying the sea lice off the fish with pressurized water, or releasing chemicals that are harmful to the sea lice.

For example, the halocline detection subsystem 104 may detect a halocline and, in response, use deep feeding lights to lure fish deeper or move an adjustable height enclosure lower to be further below the halocline. Accordingly, the fish may be deterred from entering the halocline or water immediately below the halocline, which may have a high concentration of sea lice. In another example, the halocline detection subsystem 104 may detect a halocline and, in response, reduce a trigger limit of beginning delousing in response to detecting ten sea lice in five minutes to a trigger limit of beginning delousing in response to detecting five sea lice in five minutes.

In yet another example, the halocline detection subsystem 104 may detect a halocline and, in response, adjust feeding rates or max pellet depth so that that the fish eat the majority of the feed above the halocline so that the fish are lured above the halocline. Accordingly, the fish may be deterred from entering the halocline or water immediately below the halocline which may have a high concentration of sea lice.

In still another example, the halocline detection subsystem 104 may detect a halocline and, in response, suspend recognizing and storing data regarding fish as shown in images captured at depths where the halocline is located. Accordingly, the system 100 may avoid making inaccurate detections from images that are blurry.

Figure 2:
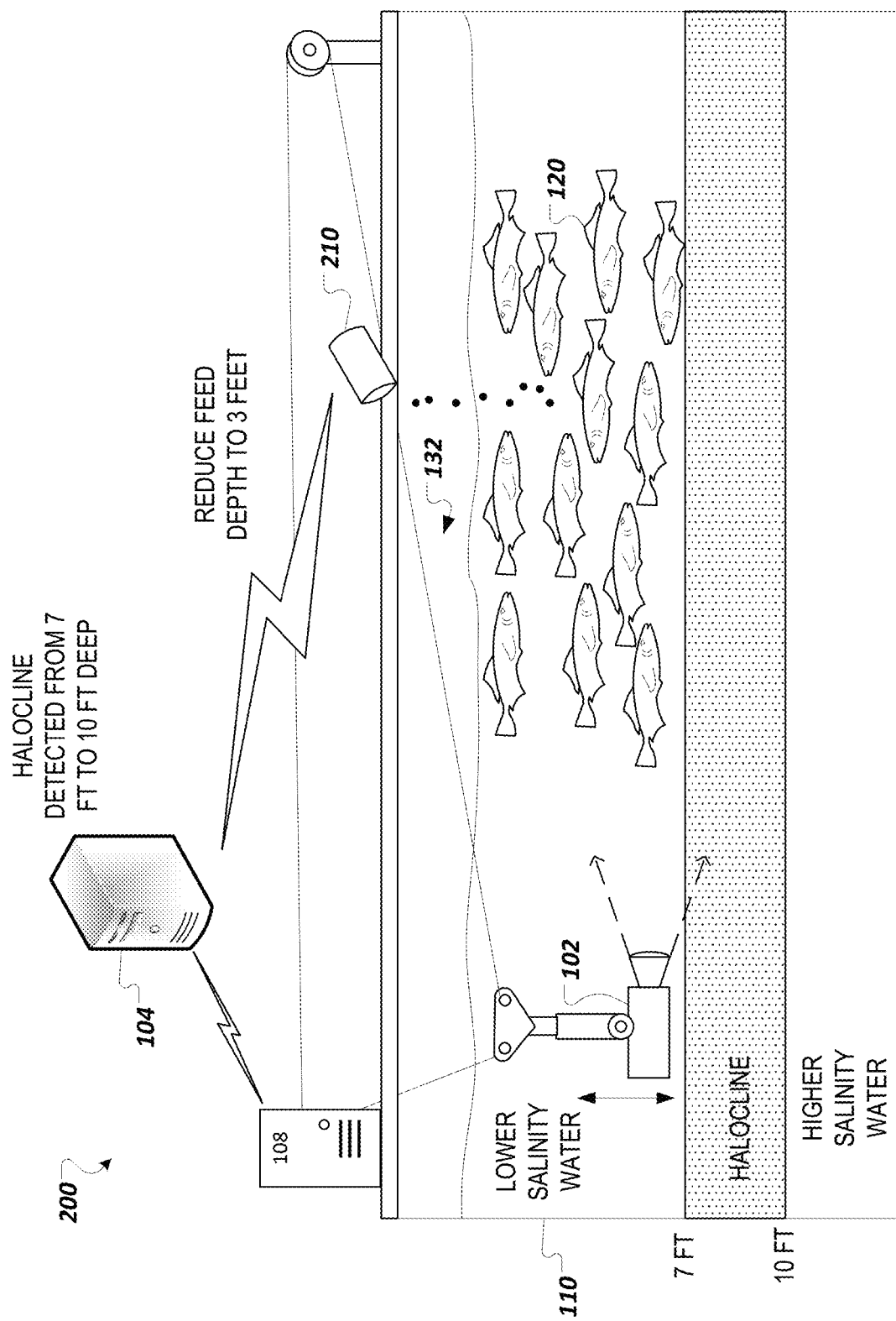
FIG. 2 is a diagram of an example system that lures fish above a halocline.

FIG. 2 is a diagram of an example system 200 that lures fish above a halocline. The system 200 may be similar to the system 100 but also include a feeder 210. FIG. 2 shows how a feed rate of the feeder 210 may be controlled so that the fish consume the feed above the halocline. The fish may generally avoid entering the halocline. Accordingly, once the fish are attracted above the halocline the fish, the fish may avoid swimming deeper and entering the halocline.

Figure 3:
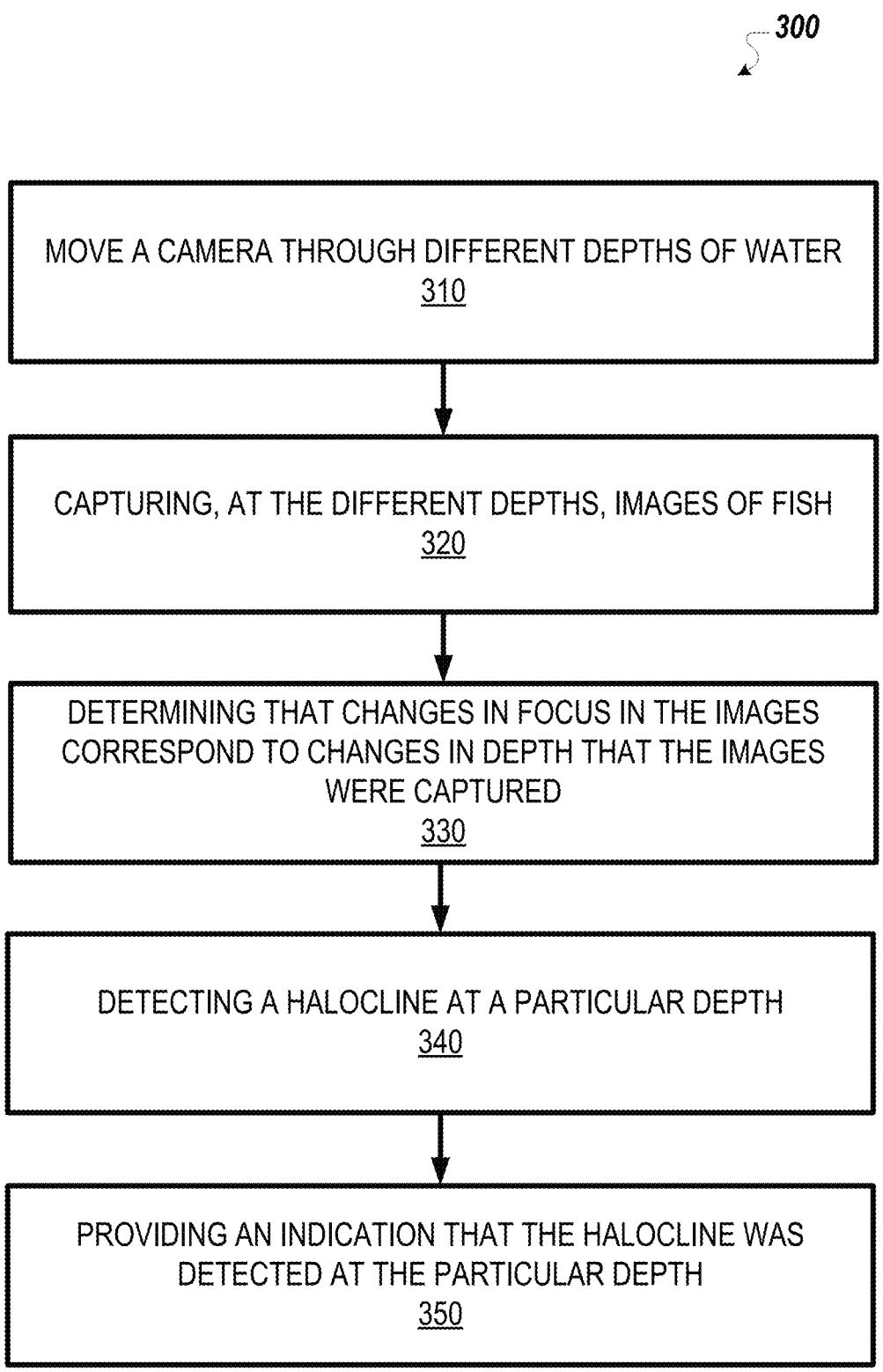
FIG. 3 is a flow diagram for an example process of visually detecting a halocline.

FIG. 3 is a flow diagram for an example process 300 for controlling a camera to observe aquaculture feeding behavior. The example process 300 may be performed by various systems, including system 100 of FIG. 1. Briefly, and as will be described further below, the process 300 includes moving a camera through different depths of water (310), capturing, at the different depths, images of fish (320), determining that changes in focus in the images correspond to changes in depth that the images were captured (330), and detecting a halocline at a particular depth (340).

The process 300 includes moving a camera through different depths of water (310). For example, the halocline detection subsystem 104 may instruct the winch subsystem 108 to move the sensor subsystem 102 from a top to a bottom or a bottom to a top of an enclosure.

The process 300 includes capturing, at the different depths, images of fish (320). For example, the halocline detection subsystem 104 may instruct the sensor subsystem 102 to capture an image for each inch of depth that the sensor subsystem 102 moves.

The process 300 includes determining that changes in focus in the images correspond to changes in depth that the images were captured (330). For example, the halocline detection subsystem 104 may detect that images from seven to ten feet deep were significantly more blurry than images captured at other depths. In another example, the halocline detection subsystem 104 may generate a depth map and detect a peak from seven feet to ten feet and, in response, determine that changes in focus in the images correspond to changes in depth that the images were captured.

In some implementations, determining that changes in focus in the images correspond to changes in depth that the images were captured includes determining distributions of pixels that are out-of-focus and in-focus in the images of the fish and determining that the distributions of pixels that are out-of-focus and in-focus of a subset of the images of the fish satisfy a distribution criteria. For example, the halocline detection subsystem 104 may determine that the proportion of pixels out-of-focus from images captured at seven to ten feet deep were at least 50%, 66%, 80% or some other percentage greater than other depths.

In some implementations, determining that the distributions of pixels that are out-of-focus and in-focus of a subset of the images of the fish satisfy a distribution criteria includes determining that a difference between the distributions of pixels that are out-of-focus and in-focus for the subset of the images of the fish and for a second subset of the images of the fish satisfy the distribution criteria. For example, the halocline detection subsystem 104 may determine that the proportion of pixels out-of-focus from images captured at seven feet deep is 50%, 66%, 80% or some other percentage greater than at six feet deep. In another example, the halocline detection subsystem 104 may determine that the proportion of pixels out-of-focus from images captured at ten feet deep is 50%, 66%, 80% or some other percentage greater than at eleven feet deep.

In some implementations, determining that a difference between the distributions of pixels that are out-of-focus and in-focus for the subset of the images of the fish and for a second subset of the images of the fish satisfy the distribution criteria includes determining from the distributions that more of the pixels were out-of-focus in the subset of the images than in the second subset of the images, where the images of the second subset of the images were captured at second depths above the depths that the images of the subset of the images were captured. For example, the halocline detection subsystem 104 may determine that the proportion of pixels out-of-focus from images captured at seven feet deep is 50%, 66%, 80% or some other percentage greater than at six feet deep and, in response, determine that the top of halocline is at seven feet.

In some implementations, determining that a difference between the distributions of pixels that are out-of-focus and in-focus for the subset of the images of the fish and for a second subset of the images of the fish satisfy the distribution criteria includes determining from the distributions that less of the pixels were out-of-focus in the subset of the images than in the second subset of the images, where the images of the second subset of the images were captured at second depths below the depths that the images of the subset of the images were captured. For example, the halocline detection subsystem 104 may determine that the proportion of pixels out-of-focus from images captured at ten feet deep is 50%, 66%, 80% or some other percentage greater than at ten feet deep and, in response, determine that the bottom of halocline is at eleven feet.

In some implementations, determining that changes in focus in the images correspond to changes in depth that the images were captured includes determining that a number of fish detected in a particular image satisfies a count criteria and based on determining that the number of fish detected in the particular image satisfies the count criteria, determining the changes in focus in the images based on the particular image and other images. For example, the halocline detection subsystem 104 may determine that only a single object is detected in an image and, in response, filter the image out by discarding the image and obtaining another image five seconds later.

The process 300 includes detecting a halocline at a particular depth (340). For example, the halocline detection subsystem 104 may detect a halocline at seven feet to ten feet based on detecting a peak in a depth map at seven feet to ten feet.

In some implementations, the process 300 includes adjusting one or more of a feed depth that the fish are feed or a feed rate that the fish are feed based on detection of the halocline at the particular depth, increasing sea lice mitigation based on detection of the halocline at the particular depth, increasing monitoring for sea lice, or disregarding one or more of sea lice detection or fish detection based on detection of the halocline at the particular depth. For example, the halocline detection subsystem 104 may instruct the feeder 210 to reduce a feed rate so that fish consume most of the feed above the halocline. In another example, the halocline detection subsystem 104 may instruct a delouser to begin releasing chemicals that kill sea lice once four lice have been detected in five minutes instead of after ten lice have been detected in five minutes. In yet another example, the halocline detection subsystem 104 may transmit an indication to a sea lice detector that a halocline is at seven feet to ten feet deep and the sea lice detector may increase a frequency for detecting sea lice from once every hour to once every thirty minutes.

In still another example, the halocline detection subsystem 104 may transmit an indication to a sea lice detector that a halocline is at seven feet to ten feet deep and the sea lice detector may skip detecting for sea lice in images captured from seven feet to ten feet deep.

In some implementations, the process 300 includes providing a depth map that indicates a top of the halocline and a bottom of the halocline. For example, the halocline detection subsystem 104 may display the depth map on a screen being viewed by a human caretaker of an enclosure.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method comprising:
    moving a camera through different depths of water within a fish enclosure;
    capturing, at the different depths, images of the fish;
    determining, in each of the images of the fish that are captured at the different depths, a quantity of pixels that are out-of-focus in the image and a quantity of pixels that are in-focus in the image;
    determining that, in one or more images of the fish that are associated with a particular depth, a proportion of the pixels that are out-of-focus or that are in-focus in the one or more image that are associated with the particular depth is different, by more than a threshold, than a proportion of pixels that are out-of-focus or that are in-focus, respectively, in one or more other images that are associated with a depth that is adjacent to the particular depth; and based on determining that the proportion of pixels that is associated with the particular depth is different, by more than the threshold, than the proportion of pixels that are associated with the depth that is adjacent to the particular depth, detecting a halocline at the particular depth.

2. The method of claim 1, wherein
the adjacent depth is above the particular depth.

3. The method of claim 2, wherein detecting the halocline at the particular depth comprises:
determining that the halocline has a top at the particular depth.

4. The method of claim 1, wherein
the adjacent depth is below the particular depth.

5. The method of claim 4, wherein detecting the halocline at the particular depth comprises:
determining that the halocline has a bottom at the particular depth.

6. The method of claim 1, comprising:
determining that a number of fish detected in a particular image satisfies a count criteria, wherein the quantity of pixels is determined based on determining that the number of fish satisfies a count criteria.

7. The method of claim 1, comprising one or more of:
adjusting one or more of a feed depth that the fish are fed or a feed rate that the fish are fed based on detection of the halocline at the particular depth;
increasing sea lice mitigation based on detection of the halocline at the particular depth; or
disregarding one or more of sea lice detection or fish detection based on detection of the halocline at the particular depth.

8. The method of claim 1, comprising:
providing a depth map that indicates a top of the halocline and a bottom of the halocline.

9. A system comprising:
one or more computers and one or more storage devices storing instructions that are operable, when executed by the one or more computers, to cause the one or more computers to perform operations comprising:
moving a camera through different depths of water within a fish enclosure;
capturing, at the different depths, images of the fish;
determining, in each of the images of the fish that are captured at the different depths, a quantity of pixels that are out-of-focus in the image and a quantity of pixels that are in-focus in the image;
determining that, in one or more images of the fish that are associated with a particular depth, a proportion of the pixels that are out-of-focus or that are in-focus in the one or more image that are associated with the particular depth is different, by more than a threshold, than a proportion of pixels that are out-of-focus or that are in-focus, respectively, in one or more other images that are associated with a depth that is adjacent to the particular depth; and
based on determining that the proportion of pixels that is associated with the particular depth is different, by more than the threshold, than the proportion of pixels that are associated with the depth that is adjacent to the particular depth, detecting a halocline at the particular depth.

10. The system of claim 9, wherein
the adjacent depth is above the particular depth.

11. The system of claim 10, wherein detecting the halocline at the particular depth comprises:
determining that the halocline has a top at the particular depth.

12. The system of claim 9, wherein
the adjacent depth is below the particular depth.

13. The system of claim 12, wherein detecting the halocline at the particular depth comprises:
determining that the halocline has a bottom at the particular depth.

14. The system of claim 9, wherein the operations comprise:
determining that a number of fish detected in a particular image satisfies a count criteria, wherein the quantity of pixels is determined based on determining that the number of fish satisfies a count criteria.

15. The system of claim 9, the operations comprising one or more of:
adjusting one or more of a feed depth that the fish are fed or a feed rate that the fish are fed based on detection of the halocline at the particular depth;
increasing sea lice mitigation based on detection of the halocline at the particular depth; or
disregarding one or more of sea lice detection or fish detection based on detection of the halocline at the particular depth.

16. A computer-readable storage device encoded with a computer program, the program comprising instructions that when executed by one or more computers cause the one or more computers to perform operations comprising:
moving a camera through different depths of water within a fish enclosure;
capturing, at the different depths, images of the fish;
determining, in each of the images of the fish that are captured at the different depths, a quantity of pixels that are out-of-focus in the image and a quantity of pixels that are in-focus in the image;
determining that, in one or more images of the fish that are associated with a particular depth, a proportion of the pixels that are out-of-focus or that are in-focus in the one or more image that are associated with the particular depth is different, by more than a threshold, than a proportion of pixels that are out-of-focus or that are in-focus, respectively, in one or more other images that are associated with a depth that is adjacent to the particular depth; and
based on determining that the proportion of pixels that is associated with the particular depth is different, by more than the threshold, than the proportion of pixels that are associated with the depth that is adjacent to the particular depth, detecting a halocline at the particular depth.

17. The computer-readable storage device of claim 16, wherein the adjacent depth is above the particular depth.

18. The computer-readable storage device of claim 17, wherein detecting the halocline at the particular depth comprises:
determining that the halocline has a top at the particular depth.

19. The computer-readable storage device of claim 16, wherein the adjacent depth is below the particular depth.

20. The computer-readable storage device of claim 19, wherein detecting the halocline at the particular depth comprises:
   determining that the halocline has a bottom at the particular depth.

21. The computer-readable storage device of claim 16, wherein the operations comprise:
   determining that a number of fish detected in a particular image satisfies a count criteria, wherein the quantity of pixels is determined based on determining that the number of fish satisfies a count criteria.

22. The computer-readable storage device of claim 16, comprising one or more of:
   adjusting one or more of a feed depth that the fish are fed or a feed rate that the fish are fed based on detection of the halocline at the particular depth;
   increasing sea lice mitigation based on detection of the halocline at the particular depth; or
   disregarding one or more of sea lice detection or fish detection based on detection of the halocline at the particular depth.

23. The computer-readable storage device of claim 16, comprising:
   providing a depth map that indicates a top of the halocline and a bottom of the halocline.

* * * * *